(12) United States Patent
Biran et al.

(10) Patent No.: US 7,870,241 B2
(45) Date of Patent: Jan. 11, 2011

(54) AUTOMATED POWER CONTROL POLICIES BASED ON APPLICATION-SPECIFIC REDUNDANCY CHARACTERISTICS

(75) Inventors: Ofer Biran, Haifa (IL); Richard Edwin Harper, Chapel Hill, NC (US); Srirama Mandyam Krishnakumar, White Plains, NY (US); Kenneth Bruce MacKenzie, Austin, TX (US); Gregory Brian Pruett, Raleigh, NC (US); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 2719 days.

(21) Appl. No.: 10/306,301

(22) Filed: Nov. 27, 2002

(65) Prior Publication Data
US 2004/0107273 A1 Jun. 3, 2004

(51) Int. Cl.
*G06F 15/173* (2006.01)
(52) U.S. Cl. ..................................... 709/223
(58) Field of Classification Search .................. 709/223
See application file for complete search history.

(56) References Cited

U.S. PATENT DOCUMENTS

| | | | |
|---|---|---|---|
| 6,167,490 A * | 12/2000 | Levy et al. .................. | 711/148 |
| 6,532,456 B1 * | 3/2003 | Wang et al. .................. | 706/48 |
| 6,681,251 B1 * | 1/2004 | Leymann et al. ............ | 709/226 |
| 6,820,035 B1 * | 11/2004 | Zahavi ........................ | 702/182 |
| 6,865,527 B2 * | 3/2005 | Go et al. ........................ | 703/22 |
| 6,963,917 B1 * | 11/2005 | Callis et al. ................. | 709/227 |
| 2002/0004912 A1 * | 1/2002 | Fung ........................... | 713/300 |

FOREIGN PATENT DOCUMENTS

| JP | 2162457 A | 6/1990 |
|---|---|---|
| JP | 8006681 A | 1/1996 |
| JP | 8087365 A | 4/1996 |
| JP | 11167442 A | 6/1999 |

OTHER PUBLICATIONS

Chase et al., "Managing Energy and Server Resources in Hosting Centers", Proceedings of the ACM Symposium on Operating systems principles, vol. 35, No. 5, Oct. 21, 2001, pp. 103-116.*

(Continued)

*Primary Examiner*—Vivek Srivastava
*Assistant Examiner*—William J Goodchild
(74) *Attorney, Agent, or Firm*—Edward J. Lenart; Cynthia G. Seal; Biggers & Ohanian, LLP

(57) ABSTRACT

Power and redundancy management policies are applied individually to the tiers of redundant servers of an application service such that power is reduced while maintaining a high level of system availability. Servers which are determined to be relatively inactive are moved to a free pool. Certain servers of the free pool are maintained in a hot standby state, while others are powered-off or set to operate in a low power mode. During times of high load, the servers in the hot standby state can be provisioned quickly into the application service.

33 Claims, 4 Drawing Sheets

OTHER PUBLICATIONS

Pinheiro et al., "Load Balancing and Unbalancing for Power and Performance in Cluster-Based Systems", Workshop on Compilers and Operating Systems for Low Power, Sep. 9, 2001.*
PCT International Search Report.
Chase J S et al: "Managing energy and server resources in hosting centers" Proceedings of the ACM Symposium on Operating Systems Principles, XX,XX, vol. 35, No. 5—Oct. 21, 2002, pp. 103-116, XP002261815.
Pinheiro E et al: "Load Balancing and Unbalancing for Power and Performance in Cluster-Based Systems" Workshop on Compliers and Operating Systems for Low Power, COLP'01, Sep. 9, 2001, XP002261813.
E Elnozahy, M Kistler, R Rajamony: "Energy-efficient server clusters" Procceding of the Workshop on Power-Aware Computing Systems, Feb. 2, 2002, XP002311105 p. 8 last paragraph.
K Appleby, S Fakhouri, L Fong, G Goldszmidt, M Kalantar, S Krishnakumar, D P Pazel, J Pershing, B Rochwerger: "Oceano-SLA Based Management of a Computing Utility" Proceedings of the IEEE-IFIP International Symposium on Intergrated Netowrk Management, May 14, 2001, pp. 855-868, XP002310934.
PCT/GB 03/04650; International Preliminary Examination Report; 2006; European Patent Office; DE.
Office Action, Application Number 03 769 672.1-2224, European Patent Office Mail Date Oct. 29, 2010.

* cited by examiner

AUTOMATED POWER CONTROL POLICIES BASED ON APPLICATION-SPECIFIC REDUNDANCY CHARACTERISTICS

BACKGROUND OF THE INVENTION

This invention pertains to clustered computing systems and other clustered information handling systems and, more particularly, to reducing the power consumed by a clusters of redundant servers.

In order to meet the demands of heavily loaded Internet application services, providers of application services have turned to redundancy in order to increase the response time of the application service. Redundancy typically refers to the addition of one or more functionally identical servers to the application service. When a single physical server acts logically as a plurality of servers, the plurality of servers are generally referred to as virtual servers. When adding servers in a redundant server environment, the servers added can be physical or virtual.

The network's deployed in heavily loaded Internet application services typically contain a finite number of network nodes. At each node resides a server or a number of servers. Either the server or the number of servers can be virtual or physical servers or any combination of both.

Service Providers typically have a large number of nodes that may be allocated among multiple customers to provide application services at various points in time. Because the offered workload may vary over time, there will be times when the numbers of nodes in the facility exceed the number of nodes required to provide the service. This presents a problem to the service provider because the excess servers consume power and other resources. The servers which are inactive and remain powered-on not only consume more power but are also susceptible to derated reliability for those reliability components which correlate to total power-on time.

SUMMARY OF THE INVENTION

To maximize cost savings it would seem to be beneficial to power off as many servers as possible. Powering off the servers, however, exposes the service provider to the risk of not being able to provision servers quickly enough during times of peak load or failure of servers that provide the application service.

The present invention provides a solution to the provider of an Internet application service seeking to power down inactive servers while at the same time eschewing the risk of not being able to provision servers quickly enough during times of peak load or server failure. In one embodiment the workload of each server of a cluster of servers which provide an application service is made. Then, the topology of the application service is determined. This topology information includes a correspondence between the components of the application service and the servers on which the components are run. And based on this workload and topology information, the power state of one or more servers is then changed.

In the preferred embodiment, the concepts of the present invention are provided in the form of a computer program product. The product is distributed on a computer readable medium such as a floppy disk or CD-ROM and installed into pre-existing (or provided) computer systems for the benefit of the customer.

In a different embodiment, the concepts of the present invention are provided in the form of an apparatus and can include the servers themselves.

In a still different embodiment, the concepts of the present invention are provided in the form of an apparatus and a program product or method and in any combination and can include the servers being managed.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
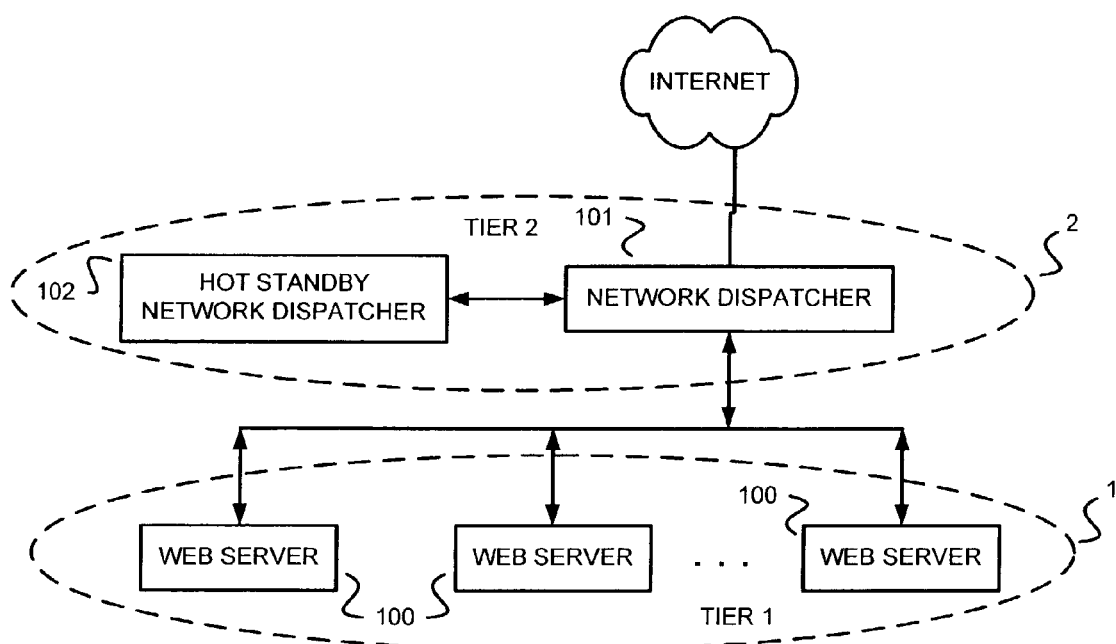
FIG. 1 is a topological diagram of an exemplary application service in which the power saving concepts of current invention are deployed.

Referring now more particularly to the accompanying drawings, FIG. 1 depicts the topology of an exemplary application service and in which the power saving concepts of the current invention are utilized. The application service of FIG. 1 is comprised of web servers 100 and network dispatchers 101 and 102. The network dispatchers 101 and 102 function as load balancing components that distribute web requests to web servers. A single hot-standby network dispatcher 102 is shown in FIG. 1, however, an application service can have any number of network dispatchers with any subset of them functioning in the hot standby state. The function of the network dispatcher is to be explained in further detail hereinafter. The term hot-standby will also be explained as the description of the preferred embodiments progresses. The web servers 100 perform the function of serving the web pages and are functionally identical. The network dispatcher 101 receives requests for web pages from the Internet and forwards the requests to the web servers 100. The web servers 100 process the individual requests and send the individual responses back to the clients on the Internet. The hot standby network dispatcher 102 is used to take over the role of the network dispatcher 101 in the case of a failure on the part of network dispatcher 101. The application service of FIG. 1 is shown with three servers and two network dispatchers. However, in general the application service can contain any number of web servers and any number of network dispatchers. Further, the application service is shown as having two tiers of servers, tier 1 for the web servers and tier 2 for the network dispatchers. Nevertheless, the application service can contain any number of tiers of redundant servers. Each tier performs a distinct function in the application service. For example, another tier can be added for servers performing a web or database application which feed information to the web servers 100. Indeed, any server function which can benefit from a scalable redundant architecture can also benefit from the concepts of the present invention. These functions, for example, include a proxy cache, FTP, DNS, Gopher, FrontPage™ and authentication functions. The database application can be any database application including a relational database such as IBM's SQL™.

The term—load—can be defined as the number of requests arriving at the network dispatcher 101 per unit of time. According to the present invention, in the case where the load on the application service is low, the number of servers used for the application service is reduced by removing certain servers from the application service. Power is then reduced by controlling the amount of power consumed by a subset of the servers removed from the application service. Additionally, a redundancy management policy is implemented for the servers of any given tier such that the application service has enough online powered-on capacity to meet the workload, plus a certain amount of spare online powered-on capacity in the form of one or more additional servers. For the example given in FIG. 1, When the load on the application service is very low the number of web servers 100 used for the application service can be reduced, from say three to two, by powering off one of the web servers for example. Furthermore, rather than powering off the web servers completely, it is also possible to save power by setting the power state to one of the industry standard semi powered-on or ultra low power states such as standby, sleep, hibernate, and other power saving states and modes. Note that the standby state is a state separate and distinct from the hot standby state which is described hereinbelow.

Figure 2:
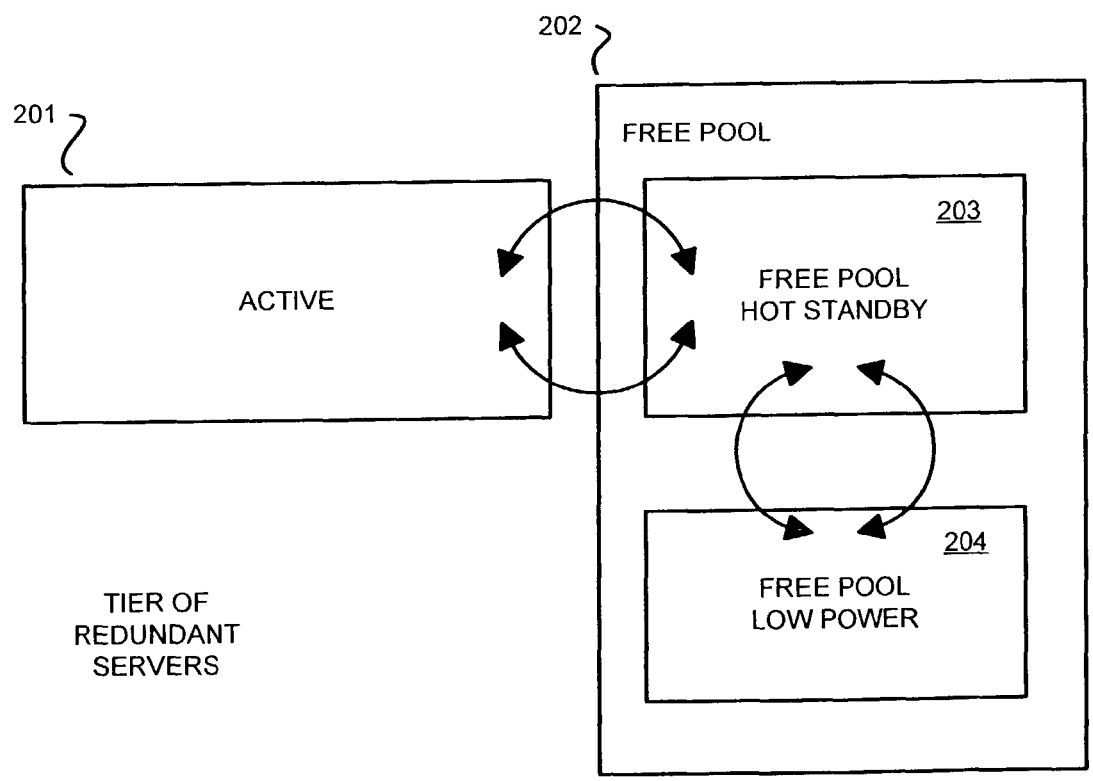
FIG. 2 depicts the provisioning of servers of the application service of FIG. 1 according to the present invention, including the moving of servers between the application service and a free pool. The free pool of servers are kept in a hot standby state and a low power state.

FIG. 2 shows the provisioning and operational states of the servers in a tier of redundant servers performing an identical function in the application service. The servers are moved to and from the active state 201 in the application service and a free pool 202 depending on the workload experienced by the servers. The active state 201 is a fully powered-on state in which a server is engaged in the application service. The servers in the free pool 202 are inactive in the particular application service under consideration. As previously mentioned, a redundancy management policy is implemented which assures enough online powered-on capacity to meet the workload demands of the application service, plus a certain amount of spare online powered-on capacity in the form of one or more additional servers. These spare online powered-on servers are referred to as hot standby servers. According to the redundancy management policy, a certain number of the servers of the free pool 202 are kept in the hot standby state 203. These hot standby servers, although inactive in the application service, can be provisioned quickly to the active state 201 in case the workload demands on the application service exceed a predetermined threshold. To reduce power, the servers of free pool 202 which are not to be kept in a hot standby state can be set to a low power state 204.

In the preferred embodiment, the topology of the application service is also taken into account when transitioning the servers between the active state 201 and the free pool 202, and between the hot standby 203 and low power 204 states within the free pool. The determination of topology can take many forms and various examples will be given herein. These examples however are not to be taken as limiting the scope of the invention. As a first example, the topology determination can take the form of determining the total number of servers currently active in the application service. In another example, the topology determination can take the form of determining the individual health of each of the servers. In determining health, the topology determination can focus on the amount of remaining memory or the extent to which memory, CPU, I/O, for any other system resource has been exhausted. In determining health, it is well-known that certain operating systems need to be reset (rebooted/restarted) every so often; thus, the topology determination can focus on the total amount of time elapsed since any given server has been reset. System bottlenecks of any sort can also be taken into account.

In still another example, the application service operates in a virtual server environment. In the virtual server environment there is not necessarily a one-to-one correspondence between a virtual server and a physical server. In this environment, the topology determination will consider whether the physical server is performing more than one function or whether the physical server is involved in more than one tier of redundant servers. For example, a physical server may be running hundreds of virtual Apache servers. In this example all Apache servers are operating in the same tier and are redundant. In still another example, the physical servers can be running virtual applications of several tiers such as proxy cache, or network dispatcher tiers. In this virtual server environment, before a server is set to the low power state 204, the topology of all virtual servers within any given physical server is taken into account and a physical server is not powered down unless all of the virtual functions performed by the physical server are determined to be in the free pool 202 and in the hot standby state 203. Once the appropriate workload and topology determinations have been made, and once it is determined that there are a sufficient number of hot standby servers in the free pool to meet the demands of the application service, then and only then will a physical server be set to a low power state or powered off completely.

A more specific example of topology and workload determination will now be given. In this example, the number of servers to be kept in the hot standby state 203 per each function type are defined by the below parameters. Here, function type refers to the function performed by the tier of redundant servers.

minHotinFreePool—This parameter provides a provision for setting a minimum number of hot standby servers of this function type in the free pool.

addOnlineRatio—This parameter represents the desired ratio between the number of servers of this function type actively participating in the application service to the number of additional servers of this function type that would be kept in the hot standby state 203. For example, if one hundred servers are actively participating in the application service, and the value of addOnlineRatio is 20, then this particular application service would require 100/20=5 hot standby servers in the free pool 202. If there were 15 total servers in the free pool 202, then the remaining 15−5=10 servers can be powered off or otherwise set to a low power mode of operation.

deployedInAllApplicationServices—This parameter denotes the total number of servers of this function type that are currently participating in the service provider's environment.

hotServersInFreePool—This parameter represents the number of servers that are to be in the free pool 202.

Now, the number of servers of a particular function type to be kept in the hot standby state 203 is determined as follows.

hotServersInFreePool=minHotInFreePool+(deployedInApplicationServices/addOnlineRatio)

In an alternative embodiment, hotServersinFreePool can be computed as follows.

hotServersinFreePool=
(minHotInFreePool>(deployedInApplicationServices/addOnlineRatio)?
minHotInFreePool:
minHotInFreePool+(deployedInApplicationServices/addOnlineRatio)

The power management system of this example will attempt to maintain the number of hot servers of a particular type in the free pool 202 to be equal to hotServersInFreePool. The remaining servers in the free pool 202 can be placed into the low-power state 204.

In the preferred embodiment of this invention, and referring now to both FIGS. 1 and 2, redundancy and power management policies are applied separately for each tier of redundant servers. These tiers are depicted as tier 1 and tier 2 in FIG. 1, and are encircled with dashed lines. The policies are applied separately because each function type is likely to have specific needs. For example, the minimum number of servers which are to be kept in hot standby state 203 are likely to vary across function type. Where the minimum number of web servers 100 can be almost any number, the minimum number of hot standby network dispatchers 102 can be more specific. While the hot standby network dispatcher 102 is not necessary utilized at all times, it cannot be powered off, as it needs to take over the active role in case of failure of the current network dispatcher 101. Power and redundancy management policies can be specified for network dispatchers such that (1) at least two network dispatcher servers must be online at all times, (2) network dispatchers can be powered on to meet additional workload, and (3) network dispatchers can be powered off as the workload decays so long as at least two are online at all times. Alternatively, the power and redundancy management policies applied to various tiers of an application service can be the same.

Figure 3:
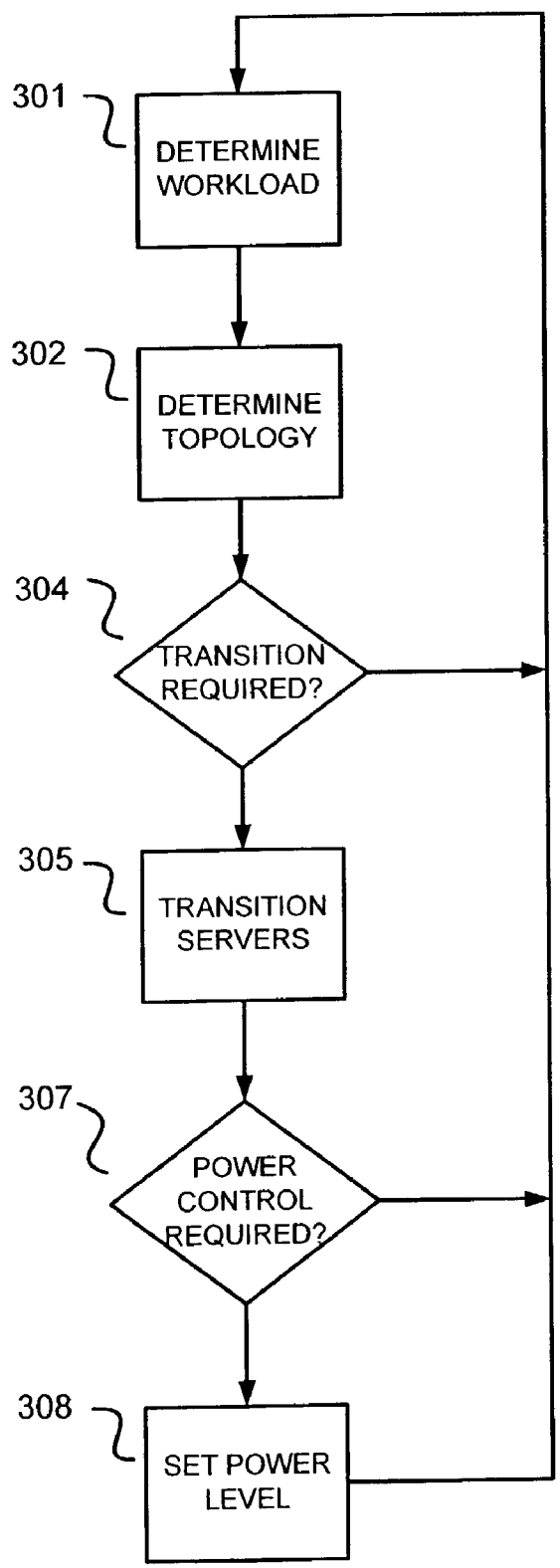
FIG. 3 is a flow diagram of the power and redundancy management policies in accordance with the teachings of the current invention.

FIG. 3 is a flow diagram of the power and redundancy management policies in accordance with the teachings of the current invention. In step 301 the workload of each server of a tier of redundant servers is determined. The workload of any given server is directly related to the load on the application service as a whole, and is further dependent on server specific attributes. Determining the workload of the server is well known in the art and will therefore not be described in any further detail. Once the workloads have been determined processing moves to step 302. In step 302, the topology of the application service is determined as per the above discussion on topology determination. The topology determination includes an accounting of the components of the application service and the servers on which those components execute. And if the application service utilizes virtual servers, a further topological determination is made relative to the virtual servers and corresponding physical servers. Once the workload and topology have been determined according to steps 301 and 302, processing continues at step 304 wherein it is determined whether a transition of any particular server is required. Transitioning of servers is required when the load placed on application service either exceeds or does not meet predetermined high and low load thresholds. If neither of the thresholds are met, processing continues at step 301. If, on the other hand, either of the thresholds are met, processing continues at step 305 wherein the servers are moved according to the following criteria. In step 305, the servers in the application service are moved out of the application service and into the free pool 202 during times of low load as determined in step 301. Conversely, the servers are moved from the free pool 202 back into the application service during times of high load as determined in step 301.

Processing than continues at step 307 and 308 wherein the power management policies described hereinabove are applied. In step 307 a decision is made relative to the power applied to the servers of the free pool 202 in accordance to the transition or transitions made to the servers in step 305. If it is determined that the current level of power applied to the servers of the free pool 202 is satisfactory, and no change is needed, processing continues at step 301. If on the other hand it is determined that more servers are needed in hot standby mode, or that fewer servers are needed, processing continues at step 308 wherein the power operating levels of one or more servers are set. In step 308, the power management policies discussed hereinabove are applied. As discussed, these policies take into account the workload and the topology as determined in steps 301 and 302. If these power management policies determine that the number of servers in the free pool 202 which are in the hot standby state 203 can be increased based upon a predetermined threshold, free pool servers in the low-power state 204 can be set to the hot standby state 203. If the power management policies determine that the number of servers in the free pool 202 which are in the hot standby state 203 can be decreased based upon a different predetermined threshold, free pool servers in the hot standby state 203 can be set to the low-power state 204. The power thresholds can be the same or different and can be either dependent or independent of each other. Once the power level or power levels have been set, processing then continues at step 301 wherein the process repeats.

Figure 4:
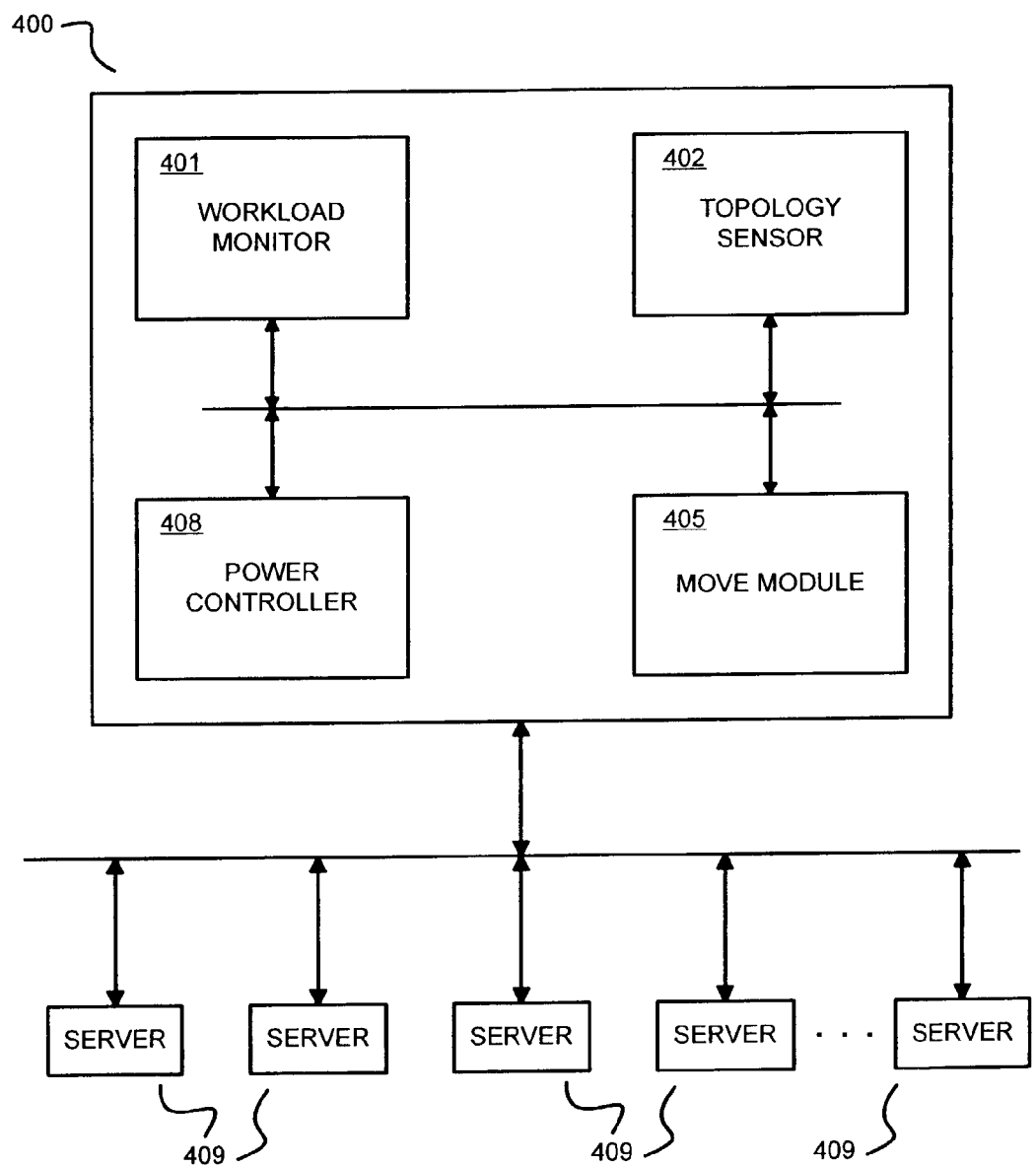
FIG. 4 is a block diagram of an alternative embodiment of this invention wherein the inventive concepts as disclosed are implemented in the form of an apparatus.

FIG. 4 depicts an alternative embodiment of this invention wherein the inventive concepts as disclosed herein are implemented as hardware apparatus 400. Apparatus 400 monitors, senses, moves and controls the power of servers 409 as described hereinabove and as the further described herein below. The servers 409 can be any of the servers or any of the tiers of servers discussed thus far. The apparatus 400 is comprised of workload monitor 401, topology sensor 402, move module 405 and power controller 408 and implements those power and redundancy management policies described herein. Workload monitor 401 determines the workload of each of the servers 409 and analogously performs the functions as described in step 301 with respect to FIG. 3. Topology sensor 402 determines the topology of each of the servers 409 and likewise performs the functions as described in step 302 with respect to FIG. 3. Move module 405 acts upon the servers 409 analogously to the steps 304 and 305 discussed with respect to FIG. 3. Power controller 408 controls the power settings of each of the servers 409 and analogously performs the functions as described in steps 307 and 308 of FIG. 3. Furthermore, apparatus 400 can be implemented as a single unit which when coupled to the servers 409 performs the functions as described in this invention. Alternatively, apparatus 400 can be implemented as a distributed series of units 401,402,405, and 408. Apparatus 400 can constructed in any of various hardware implementation methods known in the art; such as, gate arrays, microprocessors, microcomputers, custom VLSI modules, embedded network processors, etc.

In the drawings and specifications there has been set forth a preferred embodiment of the invention and, although specific terms are used, the description thus given uses terminology in a generic and descriptive sense only and not for purposes of limitation.

The invention claimed is:

1. A program product comprising:
a non-transitory computer readable medium having computer readable program code embodied therein, the computer readable program code in said program product being effective in executing the steps of:
(a) determining the workload of each server of a cluster of servers which provide an application service;
(b) determining the topology of the application service wherein said topology determination includes a correspondence between a first component of the application service and the server on which the first component is executed wherein said topology determination includes a first count of the total number of active servers; and
(c) setting the power state of one server of the cluster of servers based upon said workload determination and said topology determination, wherein said setting (c) is to a low power state when said workload determination determines a workload which is below a predetermined threshold, wherein said setting (c) is further a function of a ratio of powered-on inactive servers to the first count and includes a provision for setting a minimum number of powered on inactive servers.

2. The program product of claim 1 wherein said setting (c) is further based upon the extent to which server resources are fully utilized.

3. The program product of claim 1 wherein the low power state is a state selected from the group consisting of: standby, sleep, hibernate, and off states.

4. The program product of claim 1 wherein said setting (c) is to a low power state when said workload determination determines a workload indicative of the elapsed time since the one server was last reset.

5. The program product of claim 1 wherein said setting (c) is to a powered-on state when said workload determination determines a workload which is above a predetermined threshold.

6. A program product comprising:
a non-transitory computer readable medium having computer readable program code embodied therein, the computer readable program code in said program product being effective in executing the steps of:
(a) determining the workload of each server of a first tier of scalable redundant servers which provide an application service;
(b) determining the topology of the application service wherein said topology determination includes a first count of the total number of active first-tier servers and a correspondence between a first component of the application service and the first-tier server on which the first component is executed;
(c) transitioning a first-tier server between the application service and a free pool of first-tier servers based upon said workload determination; and
(d) controlling the power applied to each of the servers of the free pool of first-tier servers according to a first predetermined power management policy and based upon said topology determination, wherein the first predetermined power management policy applied to the servers of the free pool of first-tier servers maintains a first number of servers in a powered-on inactive state while the remaining servers are set to a low power state, wherein the first predetermined power management policy applied to the servers of the free pool of first-tier servers is a function of a ratio of powered-on inactive servers to the first count and includes a provision for setting a minimum number of powered-on inactive servers.

7. The program product of claim 6 wherein said transitioning is from the application service to the free pool of first-tier servers when said workload determination determines a workload which is below a predetermined threshold.

8. The program product of claim 7 wherein said transitioning is further based upon the extent to which server resources of the transitioning first-tier server are fully utilized.

9. The program product of claim 6, further comprising:
(e) determining the workload of each server of a second tier of scalable redundant servers which provide the application service wherein responses from the second tier of scalable redundant servers depend on responses from the first tier of scalable redundant servers;
(f) transitioning a second-tier server between the application service and a free pool of second-tier servers; and
wherein said topology determination further includes a second count of the total number of active second-tier servers, and
(g) controlling the power applied to each of the servers of the free pool of second-tier servers according to a second predetermined power management policy and based upon said topology determination;
wherein the second power management policy is a policy selected from the group consisting of the first power management policy and a policy independent of the first power management policy.

10. The program product of claim 6 wherein said transitioning is from the free pool of first-tier servers to the application service when said workload determination determines a workload which is above a predetermined threshold.

11. The program product of claim 6 wherein the low power state is a state selected from the group consisting of: standby, sleep, hibernate, and off states.

12. A method comprising:
(a) determining the workload of each server of a cluster of servers which provide an application service;
(b) determining the topology of the application service wherein said topology determination includes a correspondence between a first component of the application service and the server on which the first component is executed, wherein said topology determination includes a first count of the total number of active servers; and
(c) setting the power state of one server of the cluster of servers based upon said workload determination and said topology determination, wherein said setting (c) is to a low power state when said workload determination determines a workload which is below a predetermined threshold, wherein said setting (c) is further a function of a ratio of powered-on inactive servers to the first count and includes a provision for setting a minimum number of powered-on inactive servers.

13. The method of claim 12 wherein said setting (c) is further based upon the extent to which server resources are fully utilized.

14. The method of claim 12 wherein the low power state is a state selected from the group consisting of: standby, sleep, hibernate, and off states.

15. The method of claim 12 wherein said setting (c) is to a low power state when said workload determination determines a workload indicative of the elapsed time since the one server was last reset.

16. The method of claim 12 wherein said setting (c) is to a powered-on state when said workload determination determines a workload which is above a predetermined threshold.

17. A method comprising:
(a) determining the workload of each server of a first tier of scalable redundant servers which provide an application service;
(b) determining the topology of the application service wherein said topology determination includes a first count of the total number of active first-tier servers and a correspondence between a first component of the application service and the first-tier server on which the first component is executed;
(c) transitioning a first-tier server between the application service and a free pool of first-tier servers based upon said workload determination; and
(d) controlling the power applied to each of the servers of the free pool of first-tier servers according to a first predetermined power management policy and based upon said topology determination, wherein the first predetermined power management policy applied to the servers of the free pool of first-tier servers maintains a first number of servers in a powered-on inactive state while the remaining servers are set to a low power state, wherein the first predetermined power management policy applied to the servers of the free pool of first-tier servers is a function of a ratio of powered-on inactive servers to the first count and includes a provision for setting a minimum number of powered-on inactive servers.

18. The method of claim 17 wherein said transitioning is from the application service to the free pool of first-tier servers when said workload determination determines a workload which is below a predetermined threshold.

19. The method of claim 18 wherein said transitioning is further based upon the extent to which server resources of the transitioning first-tier server are fully utilized.

20. The method of claim 17, further comprising:
(e) determining the workload of each server of a second tier of scalable redundant servers which provide the application service wherein responses from the second tier of scalable redundant servers depend on responses from the first tier of scalable redundant servers;
(f) transitioning a second-tier server between the application service and a free pool of second-tier servers; and
wherein said topology determination further includes a second count of the total number of active second-tier servers, and
(g) controlling the power applied to each of the servers of the free pool of second-tier servers according to a second predetermined power management policy and based upon said topology determination;
wherein the second power management policy is a policy selected from the group consisting of the first power management policy and a policy independent of the first power management policy.

21. The method of claim 17 wherein said transitioning is from the free pool of first-tier servers to the application service when said workload determination determines a workload which is above a predetermined threshold.

22. The method of claim 17 wherein the low power state is a state selected from the group consisting of: standby, sleep, hibernate, and off states.

23. Apparatus comprising:
a workload monitor which detects the workload of each server of a cluster of servers which provide an application service;
a topology sensor which determines the topology of the application service including a correspondence between a first component of the application service and the server on which the first component is executed, wherein the topology as determined by said topology sensor includes a first count of the total number of active servers; and
a power controller which sets the power state of one server of the cluster of servers based upon the workload as determined by said workload monitor and the topology as determined by said topology sensor, wherein said power controller sets a low power state when said workload monitor determines a workload which is below a predetermined threshold, wherein said power controller sets the power state as a function of a ratio of powered-on inactive servers to the first count and includes a provision for setting a minimum number of powered-on inactive servers.

24. Apparatus of claim 23 wherein said power controller further sets the low power state based upon the extent to which server resources are fully utilized.

25. Apparatus of claim 23 wherein the low power state is a state selected from the group consisting of: standby, sleep, hibernate, and off states.

26. Apparatus of claim 23 wherein said power controller sets the power state to a low power state when said workload monitor determines a workload indicative of the elapsed time since the one server was last reset.

27. Apparatus of claim 23 wherein said power controller sets the power state to a powered-on state when said workload monitor determines a workload which is above a predetermined threshold.

28. Apparatus comprising:
a workload monitor which detects the workload of each server of a first tier of scalable redundant servers which provide an application service;
a topology sensor which determines the topology of the application service including a first count of the total number of active first-tier servers and a correspondence between a first component of the application service and the first-tier server on which the first component is executed;
a move module which transitions a first-tier server between the application service and a free pool of first-tier servers based upon the workload as determined by said workload monitor; and
a power controller which sets the power state of each of the servers of the free pool of first-tier servers according to a first predetermined power management policy and based upon the topology as determined by said topology sensor, wherein the first predetermined power management policy applied to the servers of the free pool of first-tier servers maintains a first number of servers in a powered-on inactive state while the remaining servers are set to a low power state, wherein the first predetermined power management policy applied to the servers of the free pool of first-tier servers is a function of a ratio of powered-on inactive servers to the first count and includes a provision for setting a minimum number of powered-on inactive servers.

29. Apparatus of claim 28 wherein the transition as executed by the move module is from the application service to the free pool of first-tier servers when said workload monitor determines a workload which is below a predetermined threshold.

30. Apparatus of claim 29 wherein the transition as executed by the move module is further based upon the extent to which server resources of the transitioning first-tier server are fully utilized.

31. Apparatus of claim 28
wherein said workload monitor further determines the workload of each server of a second tier of scalable redundant servers which provide the application service wherein responses from the second tier of scalable redundant servers depend on responses from the first tier of scalable redundant servers; and wherein said move module further transitions a second-tier server between the application service and a free pool of second-tier servers; and wherein the topology as determined by said topology sensor further includes a second count of the total number of active second-tier servers; and wherein said power controller further sets the power state of each of the servers of the free pool of second-tier servers according to a second predetermined power management policy and based upon the topology as determined by said topology sensor; and wherein the second power management policy is a policy selected from the group consisting of the first power management policy and a policy independent of the first power management policy.

32. Apparatus of claim 28 wherein the transition as executed by the move module is from the free pool of first-tier servers to the application service when said workload monitor determines a workload which is above a predetermined threshold.

33. Apparatus of claim 28 wherein the low power state is a state selected from the group consisting of: standby, sleep, hibernate, and off states.

* * * * *